United States Patent
Hartley et al.

(10) Patent No.: US 6,910,012 B2
(45) Date of Patent: Jun. 21, 2005

(54) METHOD AND SYSTEM FOR SPEECH RECOGNITION USING PHONETICALLY SIMILAR WORD ALTERNATIVES

(75) Inventors: Matthew W. Hartley, Boynton Beach, FL (US); David E. Reich, Jupiter, FL (US)

(73) Assignee: International Business Machines Corporation, Armonk, NY (US)

(*) Notice: Subject to any disclaimer, the term of this patent is extended or adjusted under 35 U.S.C. 154(b) by 493 days.

(21) Appl. No.: 09/858,741

(22) Filed: May 16, 2001

(65) Prior Publication Data

US 2002/0173956 A1 Nov. 21, 2002

(51) Int. Cl.⁷ .............................................. G10L 15/02
(52) U.S. Cl. ....................... 704/243; 704/231; 704/239; 704/251
(58) Field of Search ................................ 704/231, 239, 704/243, 246, 247, 251, 252

(56) References Cited

U.S. PATENT DOCUMENTS

| | | | | |
|---|---|---|---|---|
| 5,917,890 A | * | 6/1999 | Brotman et al. | 379/88.01 |
| 6,321,196 B1 | * | 11/2001 | Franceschi | 704/243 |
| 6,411,932 B1 | * | 6/2002 | Molnar et al. | 704/260 |
| 6,629,071 B1 | * | 9/2003 | Mann | 704/251 |

* cited by examiner

*Primary Examiner*—Susan McFadden
(74) *Attorney, Agent, or Firm*—Akerman Senterfitt

(57) ABSTRACT

A method for performing speech recognition can include the steps of providing a grammar including entries comprising a parent word and a pseudo word being substantially phonetically equivalent to the parent word. The grammar can provide a translation from the pseudo word to the parent word. The parent word can be received as speech and the speech can be compared to the grammar entries. Additionally, the speech can be matched to the pseudo word and the pseudo word can be translated to the parent word.

23 Claims, 4 Drawing Sheets

METHOD AND SYSTEM FOR SPEECH RECOGNITION USING PHONETICALLY SIMILAR WORD ALTERNATIVES

BACKGROUND OF THE INVENTION

1. Field of the Invention

This invention relates generally to speech recognition systems, and more particularly, to the use of grammars for improved speech recognition.

2. Description of the Related Art

Speech recognition is the process by which an acoustic signal received by microphone is converted to a set of text words, numbers, or symbols by a computer. These recognized words may then be used in a variety of computer software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receiving and digitizing an acoustic speech signal, the speech recognition system can analyze the digitized speech signal, identify a series of acoustic models within the speech signal, and derive a list of potential word candidates corresponding to the identified series of acoustic models. Notably, the speech recognition system can determine a measurement reflecting the degree to which the potential word candidates phonetically match the digitized speech signal.

Speech recognition systems also can analyze the potential word candidates with reference to a contextual model. This analysis can determine a probability that one of the word candidates accurately reflects received speech based upon previously recognized words. The speech recognition system can factor subsequently received words into the probability determination as well. The contextual model, often referred to as a language model, can be developed through an analysis of many hours of human speech. Typically, the development of a language model can be domain specific. For example, a language model can be built reflecting language usage within a legal context, a medical context, or for a general user.

The accuracy of speech recognition systems is dependent on a number of factors. One such factor can be the context of a user spoken utterance. In some situations, for example where the user is asked to spell a word, phrase, number, or an alphanumeric string, little contextual information can be available to aid in the recognition process. In these situations, the recognition of individual letters or numbers, as opposed to words, can be particularly difficult because of the reduced contextual references available to the speech recognition system. This can be particularly acute in a spelling context, such as where a user provides the spelling of a name. In other situations, such as a user specifying a password, the characters can be part of a completely random alphanumeric string. In that case, a contextual analysis of previously recognized characters offers little, if any, insight as to subsequent user speech.

Still, situations can arise in which the speech recognition system has little contextual information from which to recognize actual words. For example, when a term of art is uttered by a user, the speech recognition system can lack a suitable contextual model to process such terms. Thus, once the term of art is encountered, similar to the aforementioned alphanumeric string situation, that term of art provides little insight for predicting subsequent user speech.

Another factor which can affect the recognition accuracy of speech recognition systems can be the quality of an audio signal. Oftentimes, telephony systems use low quality audio signal to represent speech. The use of low quality audio signal within telephony systems can exacerbate the aforementioned problems because a user is likely to provide a password, name, or other alphanumeric string on a character by character basis when interacting with an automated computer-based system over the telephone.

SUMMARY OF THE INVENTION

The invention disclosed herein provides a method and a system for performing speech recognition. The invention can be useful in recognizing individual characters, wherein a user specifies a character string on a character by character basis. The invention, however, is not limited in this regard and can be used to recognize words as well. Specifically, the invention can incorporate within a grammar, one or more alternate words or alternate word spellings which can be phonetically similar to a word specified by a user spoken utterance. The alternate words and alternate word spellings can be referred to as pseudo words, while the actual word specified by the user spoken utterance, and the word to which the pseudo words correspond, can be referred to as the parent word. The pseudo words and the parent words within the grammar provide the speech recognition system with varied phonetic representations, or baseforms, of recognizable words. Consequently, the likelihood of the speech recognition system matching a received user spoken utterance to a parent or pseudo word increases. The grammar further can be programmed with translation rules which can translate the pseudo word to its corresponding parent word. After translation of the pseudo word, the parent word can be provided as output from the speech recognition system.

One aspect of the present invention can include a method for performing speech recognition including providing a grammar including entries comprising a parent word and a pseudo word being substantially phonetically equivalent to the parent word. Notably, the pseudo word can be phonetically similar to the parent word. The parent word can be a character such as a letter, number, or symbol including international symbols and other character sets. The grammar can provide a translation from the pseudo word to the parent word. The method further can include receiving the parent word as speech and comparing the speech to the grammar entries. The comparing step can include generating a confidence score for the parent word and the pseudo word. The pseudo word can be selected as a match for the speech. For example, the pseudo word having the highest confidence score can be identified. The pseudo word can be translated to the parent word.

Another aspect of the invention can include a method for performing speech recognition including providing a spelling grammar including one or more entries comprising a parent letter and a pseudo word being substantially phonetically equivalent to the parent letter. Notably, the pseudo word can be phonetically similar to the parent letter. The spelling grammar can include a pseudo word corresponding to each letter of the alphabet. The spelling grammar can provide a translation from the pseudo word to the parent letter. The parent letter can be received as speech. The speech can be compared to the grammar entries. For example, a confidence score can be generated for the parent letter and the pseudo word. The pseudo word can be selected as a match for the speech and translated to the parent letter. For instance, the pseudo word having the highest confidence score can be identified.

Another aspect of the invention can include a speech recognition system comprising a speech recognition engine. The speech recognition engine can include a grammar including a parent word and a pseudo word being substantially phonetically equivalent to the parent word. The grammar can provide a translation from the pseudo word to the parent word. Additionally, the parent word can be a character; and, the grammar can be a spelling grammar.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
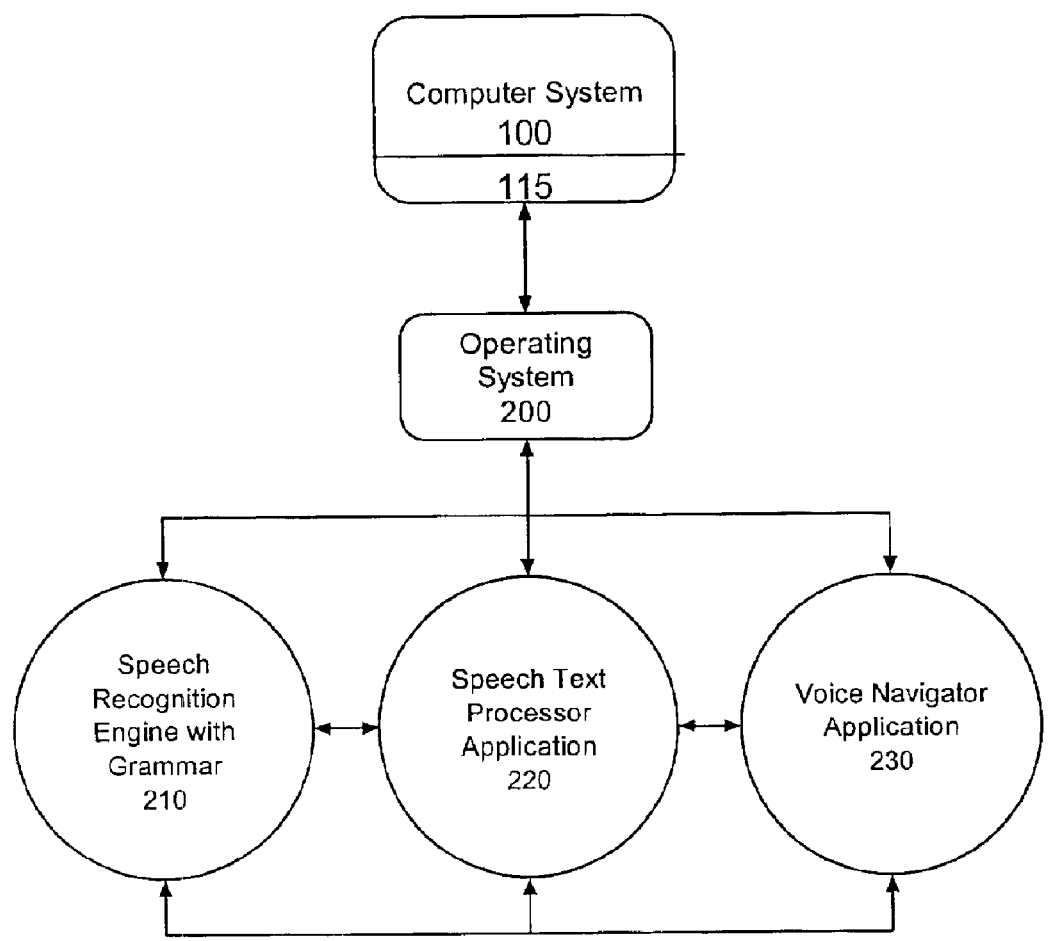
FIG. 1 is a schematic diagram depicting an exemplary architecture for speech recognition.

The invention disclosed herein provides a method and a system for performing speech recognition. The invention can be particularly useful in recognizing individual characters, for example, in the context of a user specifying a character string on a character by character basis. The invention, however, is not limited in this regard and can be used to recognize words as well. Specifically, the invention can incorporate within a grammar, one or more alternate words and alternate word spellings which can be phonetically similar to a particular user specified word.

Generally, a grammar can be a structured collection of words and phrases bound together by rules that define the set of all utterances that can be recognized by the speech engine at a given point in time. The alternate words and alternate word spellings can be referred to as pseudo words, while the user specified word, or the word to which the alternates correspond, can be referred to as the parent word. The pseudo words and the parent words within the grammar provide the speech recognition system with varied phonetic representations, or baseforms, of recognizable words, phrases, or characters. The grammar can be programmed with a series of rules which cause the speech recognition system to translate the pseudo words into the parent word. These rules can be referred to as translation rules.

Those skilled in the art will recognize that providing pseudo words within a grammar provides the speech recognition system with slightly differing phonetic representations of the parent word. This can increase the accuracy of a speech recognition system. Accordingly, where a user specifies a word or character in situations with little contextual information, such as where the user spells a name or otherwise specifies an alphanumeric string on a character by character basis, the speech recognition system can identify the parent word as a word candidate. Due to a variety of factors such as poor audio quality making an acoustic analysis difficult, and a lack of contextual information, the speech recognition system can determine that the parent word has a low confidence score and is not the user intended word. A pseudo word, however, having a slight phonetic variation from the parent word can be determined to have a higher confidence score than the parent word. Consequently, the pseudo word can be selected as the word candidate which most accurately reflects the user specified word. The grammar can be programmed with a translation rule that translates the pseudo word into the parent word.

In illustration, the invention can be used in the context of a user providing a password over a telephonic connection. In that case, any previously recognized characters of the password provide little or no information regarding a next character to be received and recognized. Accordingly the language model provides little help to the speech recognition system. For instance, if the user utters the letter "C", the speech recognition system can accurately recognize the utterance as the letter "C". In such situations, however, the lack of contextual information forces the speech recognition system to rely more heavily upon an acoustic analysis of the utterance.

The inclusion of a wide range of phonetically similar pseudo words in combination with translation rules can lead to improved recognition accuracy. For example, by including one or more phonetically similar pseudo words within the grammar such as "see", "sea", "cee", along with the parent word "C", wherein each pseudo word has a translation rule producing the letter "C", the likelihood of a correct recognition increases. It should be appreciated that additional pseudo words such as "seed" can be included within the grammar because of the word's acoustic similarity to the letter "C". Accordingly, the pseudo words can be phonetically similar to the parent word such that a mistake by the speech recognizer in not recognizing a parent can result in a corresponding pseudo word being selected as a correct recognition result. More specifically, an acoustic analysis of the user spoken utterance can determine that one of the pseudo words provides a higher confidence score than the parent word "C". Notably, despite which pseudo word is selected as the most likely word candidate, a translation rule can translate the pseudo word into the parent word. It should be appreciated that the speech recognition system can determine that the user did not utter the actual words "see", "sea", or "seed" based on the context of the user spoken utterance. Such an interpretation can result in a low confidence score such that those words would not be selected as likely candidates.

A typical computer system can be used in conjunction with the present invention. The system can include a computer having a central processing unit (CPU), one or more memory devices, and associated circuitry. The memory devices can be comprised of an electronic random access memory and a bulk data storage medium. The system also can include a microphone operatively connected to the computer system through suitable interface circuitry 125, and an optional user interface display unit such as a video data terminal operatively connected thereto. The CPU can be comprised of any suitable microprocessor or other electronic processing unit, as is well known to those skilled in the art. Speakers, as well as interface devices, such as a mouse and a keyboard, can be provided with the system, but are not necessary for operation of the invention as described herein. The various hardware requirements for the computer system as described herein generally can be satisfied by any one of many commercially available high-speed computers.

FIG. 1 is a schematic diagram illustrating a typical architecture for a speech recognition system in a computer 100 such as the previously described computer system. As shown in FIG. 1, within the memory 115 of computer system 100 can be an operating system 200 and a speech recognition engine 210 having a grammar in accordance with the inventive arrangements disclosed herein. Also included can be a speech text processor application 220 and a voice navigator application 230. The invention, however, is not limited in this regard and the speech recognition engine 210 can be used with any other application program which is to be voice enabled. In FIG. 1, the speech recognition engine 210, speech text processor application 220, and the voice navigator application 230 are shown as separate application programs. It should be noted, however, that the invention is not limited in this regard, and these various application programs can be implemented as a single, more complex application program. For example, the speech recognition engine 210 can be combined with the speech text processor application 220 or with any other application to be used in conjunction with the speech recognition engine 210. Also, if no other speech controlled application programs are to be operated in conjunction with the speech text processor application 220 and speech recognition engine 210, the system can be modified to operate without the voice navigator application 230. The voice navigator application 230 primarily helps coordinate the operation of the speech recognition engine 210.

In operation, audio signals representative of sound received through a microphone can be processed within computer 100 using conventional computer audio circuitry so as to be made available to the operating system 200 in digitized form. Alternatively, audio signals can be received via a computer communications network from another computer system in analog or digital format or from another transducive device such as a telephone. The audio signals received by the computer system 100 are conventionally provided to the speech recognition engine 210 via the computer operating system 200 in order to perform speech recognition functions. As in conventional speech recognition systems, the audio signals can be processed by the speech recognition engine 210 to identify words spoken by a user into the microphone.

Figure 2:
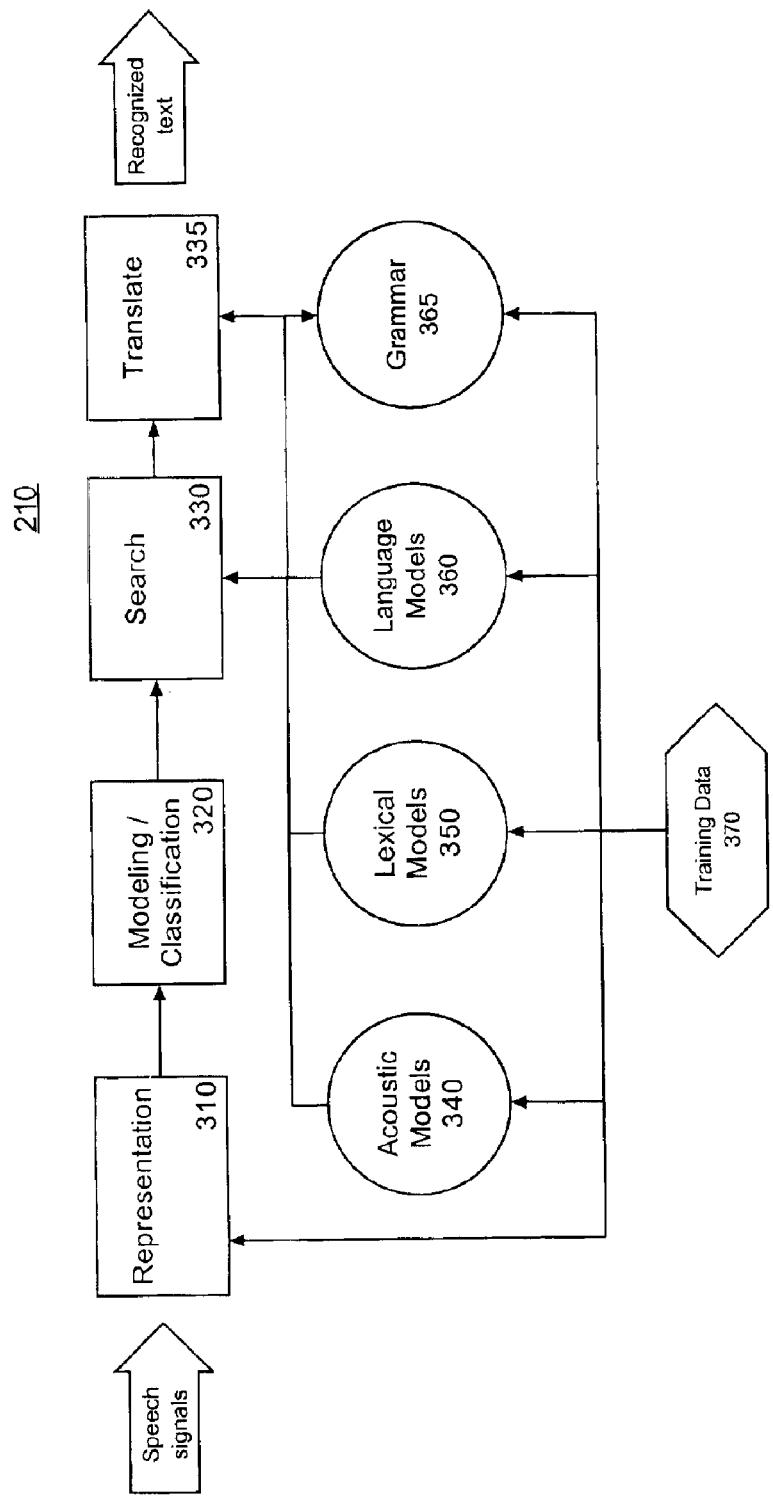
FIG. 2 is a block diagram showing typical components which can comprise a speech recognition engine in accordance with the inventive arrangements.

FIG. 2 is a block diagram showing typical components which can comprise speech recognition engine 210. As shown in FIG. 2 the speech recognition engine 210 receives a digitized speech signal from the operating system. The system is subsequently transformed in representation block 310 into a useful set of data by sampling the signal at some fixed rate, typically every 10–20 msec. The representation block produces a new representation of the audio signal which then can be used in subsequent stages of the voice recognition process to determine the probability that the portion of the wave form just analyzed corresponds to a particular phonetic event. This process is intended to emphasize perceptually important speaker independent features of the speech signals received from the operating system. In modeling/classification block 320, the speech signals are processed further to adapt speaker-independent acoustic models to those of the current speaker. Finally, in search block 330, search algorithms are used to guide the search engine to the most likely words corresponding to the speech signal. The search block 330 occurs with the help of acoustic models 340, lexical models 350, and language models 360. If search block 330 selects a pseudo word from the grammar 365 as a match for a received user spoken utterance, the pseudo word can be translated to its corresponding parent word.

The invention can utilize a confidence score as part of the recognition process. A confidence score, which is well known in the art, reflects the likelihood that a particular word candidate or series of word candidates accurately reflects the corresponding user spoken utterance. The confidence score can be a value derived from a comparison of the speech signal to acoustic models, lexical models, language models, and grammars using statistical processing methods known in the art. For example, the confidence score can take into account the likelihood that a particular word candidate or word candidates represent a user spoken utterance as determined using an acoustic model, in addition to the probability that the particular word candidate can be located next to another word or group of words as determined using a language model. It should be appreciated by those skilled in the art that the confidence score can be expressed in any of a variety of formats or conventions. In one embodiment, the confidence score can be expressed as a normalized value.

Figure 3:
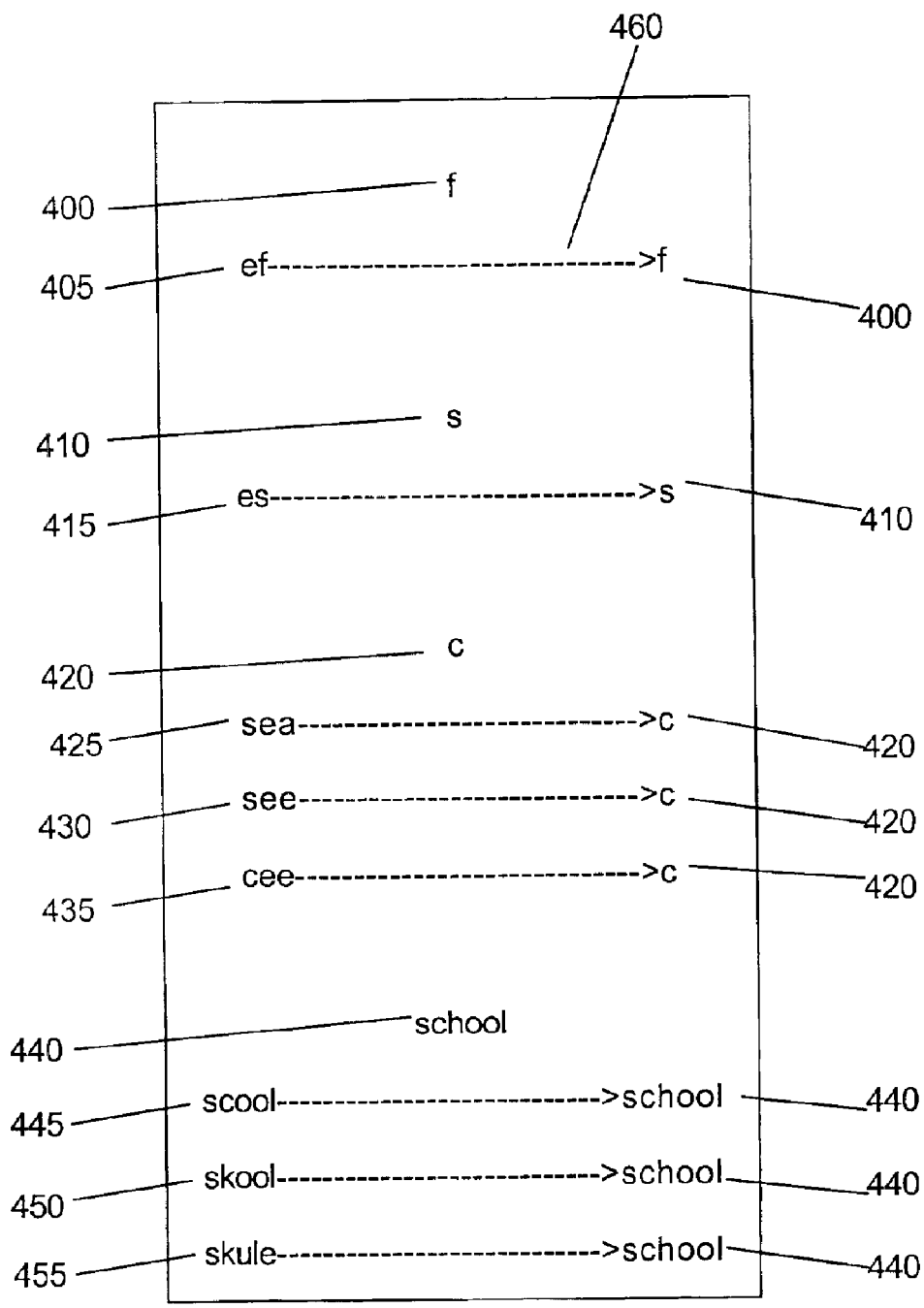
FIG. 3 is a pictorial illustration depicting an exemplary grammar in accordance with the inventive arrangements.
Figure 4:
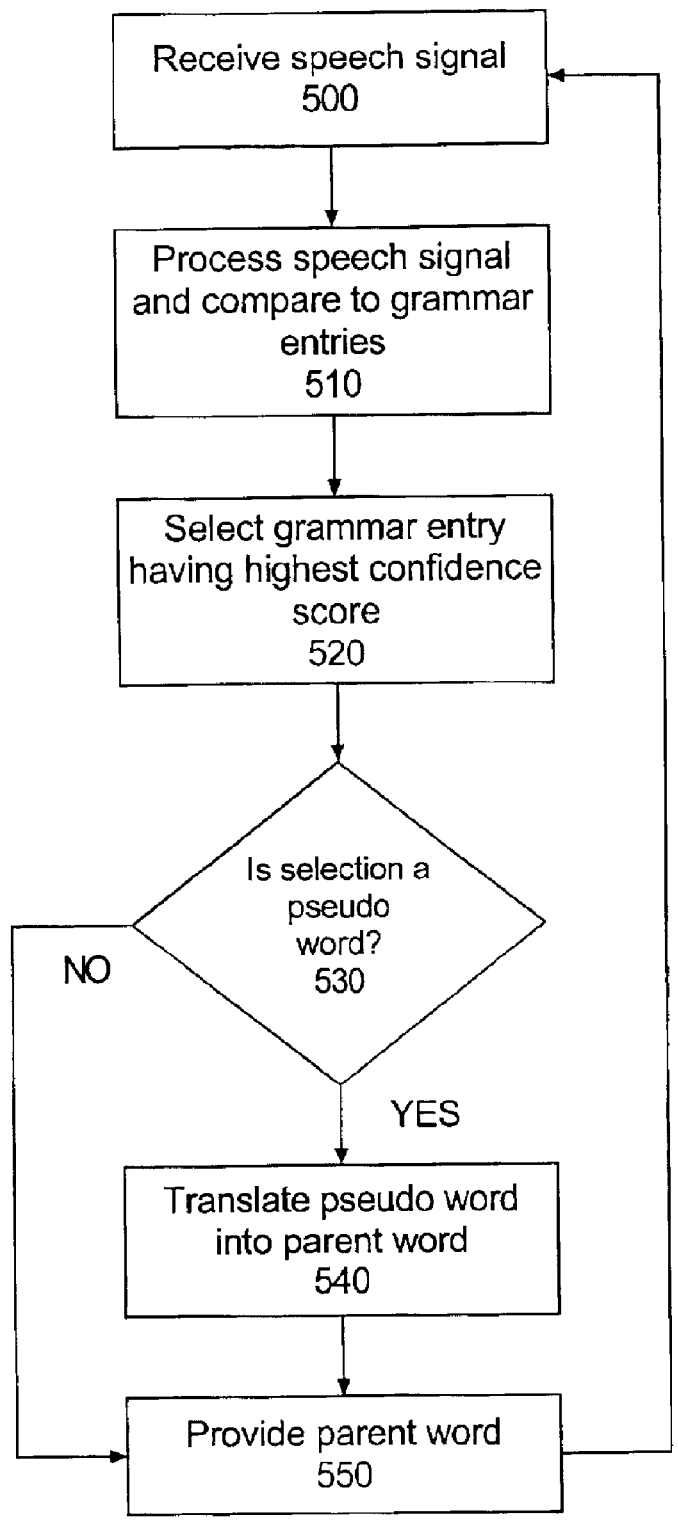
FIG. 4 is a flow chart illustrating an exemplary method for performing speech recognition in accordance with the inventive arrangements.

FIG. 3 is a exemplary grammar which can be used by the speech recognition system of FIG. 1. As mentioned, a grammar can be a structured collection of words and phrases bound together by rules that define the set of all utterances that can be recognized by the speech engine at a given point in time. As shown in FIG. 4, the exemplary grammar can include word entries comprising parent words and pseudo words, with translation rules 460 linking parent and pseudo words. The parent words can be any words or characters for which pseudo words offering phonetically similar alternatives can be provided. Accordingly, as shown in the grammar, the letters "F", "S", and "C" can be parent words 400, 410 and 420 respectively. Also, the word "school" 440 can be a parent word.

Beneath each parent word can be one or more pseudo words which provide substantially similar phonetic representations of the parent words. For example, the parent word "F" 400 can be represented by the pseudo word "ef" 405. Notably, the pseudo words can be actual words or can be phonetic representations of the parent which are not actual words. Accordingly, a pseudo word can include one or more characters serving as phonetic representations of its parent word. The parent word "S" 410 can be represented by the pseudo word "es" 415. The parent word "C" 420 can be represented by the pseudo words "sea" 425, "see" 430", and "cee" 435. The parent word "school" 440 can be represented by the pseudo words "scool" 445, "skool" 450, and "skule" 455.

Translation rules 460 can instruct the speech recognition system to translate each pseudo word into its corresponding parent word. Thus, the pseudo word "es" 415 can translate into the parent "S"; and, "sea" 425 can translate into "C" 420. Each parent can remain the same and need not have a corresponding translation rule. Pseudo words can be provided for actual words or characters, such as letters, numbers, and symbols including international symbols and other character sets.

FIG. 4 is a flow chart illustrating an exemplary method for performing speech recognition in accordance with the inventive arrangements. The method illustrated in FIG. 4 can begin in a state wherein a user is providing a user spoken utterance. Consequently, the user spoken utterance can be digitized and provided to the speech recognition system for processing. In step 500, the speech recognition system can receive a speech signal. For example, a speech signal representative of a user specified word "school" or the letter "F" can be received.

In step 510, the speech signal can be processed to determine a phonetic representation of the received speech signal.

This phonetic representation of the speech signal can be compared to the grammar entries within the grammar. As previously noted, the grammar entries can include both parent words and pseudo words serving as phonetically similar, if not identical, alternate representations of the parent words. The processed speech signal can be compared to the grammar entries by calculating a confidence score reflecting the degree to which a particular grammar entry phonetically matches the processed speech signal. The higher the confidence score, the closer the grammar entry phonetically matches the processed speech signal. After completion of step 510, the method can continue to step 520.

In step 520, the grammar entry having the highest confidence score can be selected as the closest phonetic match to the speech signal. For example, though the user uttered the letter "F", the resulting speech signal can more closely match the pseudo word "ef". In other words, an analysis of the speech signal can determine that the pseudo word "ef" has a higher confidence score than the parent word "F". Similarly, if the user utters "school", the pseudo word "skule" can be determined to have a higher confidence score than the parent word "school". After completion of step 520, the method can continue to step 530.

In step 530, a determination can be made as to whether the selected grammar entry is a pseudo word. If so, the method can continue to step 540 where the pseudo word can be translated into its corresponding parent word as specified by the translation rules within the grammar. For example, the pseudo word "skule" can be translated to its parent word "school". Similarly, the pseudo word "ef" can be translated to its parent word "F". Once the pseudo word has been translated, the method can continue to step 550 where the parent word can be provided as output. Notably, if the selected word was not determined to be a pseudo word in step 530, the method can proceed directly to step 550 wherein that word can be provided as output without translation. After completion of step 550, the method can repeat as necessary.

The present invention can be realized in hardware, software, or a combination of hardware and software. In accordance with the inventive arrangements, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The system disclosed herein can be implemented by a programmer, using commercially available development tools for the particular operating system used. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other specific forms without departing from the spirit or essential attributes thereof, and accordingly reference should be made to the following claims, rather than to the foregoing specification, as indicating the scope of the invention.

What is claimed is:

1. A method for performing speech recognition comprising:
   providing a grammar including entries comprising a parent word and a pseudo word being phonetically similar to said parent word, said grammar providing a translation from said pseudo word to said parent word, wherein said pseudo word is a false word;
   receiving said parent word as speech;
   comparing said speech to said grammar entries; and
   selecting said pseudo word as a match for said speech and translating said pseudo word to said parent word.

2. The method of claim 1, said comparing step comprising:
   generating a confidence score for said parent word and said pseudo word.

3. The method of claim 1, said matching step further comprising:
   identifying said pseudo word having a highest confidence score.

4. The method of claim 1, wherein said parent word is a character.

5. A method for performing speech recognition comprising:
   providing a spelling grammar including one or more entries comprising a parent letter and a pseudo word being phonetically similar to said parent letter, said spelling grammar providing a translation from said pseudo word to said parent letter, wherein said pseudo word is a false word;
   receiving said parent letter as speech;
   comparing said speech to said grammar entries; and
   selecting said pseudo word as a match for said speech and translating said pseudo word to said parent letter.

6. The method of claim 5, said comparing step comprising:
   generating a confidence score for said parent letter and said pseudo word.

7. The method of claim 5, said matching step further comprising:
   identifying said pseudo word having a highest confidence score.

8. The method of claim 5, wherein said spelling grammar contains a pseudo word corresponding to each letter of the alphabet.

9. A method for performing speech recognition comprising:
   providing a grammar including entries comprising a parent word and a pseudo word being substantially phonetically equivalent to said parent word, said grammar providing a translation from said pseudo word to said parent word;
   receiving said parent word as speech;
   comparing said speech to said grammar entries; and
   selecting said pseudo word as a match for said speech and translating said pseudo word to said parent word.

10. A method for performing speech recognition comprising:
    providing a spelling grammar including one or more entries comprising a parent letter and a pseudo word being substantially phonetically equivalent to said parent letter, said spelling grammar providing a translation from said pseudo word to said parent letter;

receiving said parent letter as speech;

comparing said speech to said grammar entries; and selecting said pseudo word as a match for said speech and translating said pseudo word to said parent letter.

11. A speech recognition system comprising a speech recognition engine, said speech recognition engine including a grammar including a parent word and a pseudo word being substantially phonetically equivalent to said parent word, said grammar providing a translation from said pseudo word to said parent word.

12. The system of claim 11, wherein said parent word is a character.

13. The system of claim 11, wherein said grammar is a spelling grammar.

14. A machine readable storage, having stored thereon a computer program having a plurality of code sections executable by a machine for causing the machine to perform the steps of:

providing a grammar including entries comprising a parent word and a pseudo word being phonetically similar to said parent word, said grammar providing a translation from said pseudo word to said parent word, wherein said pseudo word is a false word;

receiving said parent word as speech;

comparing said speech to said grammar entries; and selecting said pseudo word as a match for said speech and translating said pseudo word to said parent word.

15. The machine readable storage of claim 14, said comparing step comprising:

generating a confidence score for said parent word and said pseudo word.

16. The machine readable storage of claim 14, said matching step further comprising:

identifying said pseudo word having a highest confidence score.

17. The machine readable storage of claim 14, wherein said parent word is a character.

18. A machine readable storage, having stored thereon a computer program having a plurality of code sections executable by a machine for causing the machine to perform the steps of:

providing a spelling grammar including one or more entries comprising a parent letter and a pseudo word being phonetically similar to said parent letter, said spelling grammar providing a translation from said pseudo word to said parent letter, wherein said pseudo word is a false word;

receiving said parent letter as speech;

comparing said speech to said grammar entries; and selecting said pseudo word as a match for said speech and translating said pseudo word to said parent letter.

19. The machine readable storage of claim 18, said comparing step comprising:

generating a confidence score for said parent letter and said pseudo word.

20. The machine readable storage of claim 18, said matching step further comprising:

identifying said pseudo word having a highest confidence score.

21. The machine readable storage of claim 18, wherein said spelling grammar contains a pseudo word corresponding to each letter of the alphabet.

22. A machine readable storage, having stored thereon a computer program having a plurality of code sections executable by a machine for causing the machine to perform the steps of:

providing a grammar including entries comprising a parent word and a pseudo word being substantially phonetically equivalent to said parent word, said grammar providing a translation from said pseudo word to said parent word;

receiving said parent word as speech;

comparing said speech to said grammar entries; and selecting said pseudo word as a match for said speech and translating said pseudo word to said parent word.

23. A machine readable storage, having stored thereon a computer program having a plurality of code sections executable by a machine for causing the machine to perform the steps of:

providing a spelling grammar including one or more entries comprising a parent letter and a pseudo word being substantially phonetically equivalent to said parent letter, said spelling grammar providing a translation from said pseudo word to said parent letter;

receiving said parent letter as speech;

comparing said speech to said grammar entries; and selecting said pseudo word as a match for said speech and translating said pseudo word to said parent letter.

* * * * *